(12) United States Patent
Bassani

(10) Patent No.: US 6,804,955 B2
(45) Date of Patent: Oct. 19, 2004

(54) DUAL MOTORCYCLE EXHAUST SYSTEM

(76) Inventor: Darryl C. Bassani, 5729 Grandview, Yorba Linda, CA (US) 92886

( * ) Notice: Subject to any disclaimer, the term of this patent is extended or adjusted under 35 U.S.C. 154(b) by 0 days.

(21) Appl. No.: 10/255,131

(22) Filed: Sep. 25, 2002

(65) Prior Publication Data

US 2003/0056503 A1 Mar. 27, 2003

Related U.S. Application Data

(60) Provisional application No. 60/326,026, filed on Sep. 26, 2001.

(51) Int. Cl.[7] .............................................. F02B 27/02
(52) U.S. Cl. ............................ 60/313; 60/312; 60/322; 180/89.2; 180/296
(58) Field of Search .......................... 60/312, 313, 314, 60/322, 323; 180/89.2, 225, 296, 309

(56) References Cited

U.S. PATENT DOCUMENTS

| | | | | |
|---|---|---|---|---|
| 3,545,414 A | * | 12/1970 | Thompson | 60/323 |
| 4,154,058 A | * | 5/1979 | Mase et al. | 60/293 |
| 4,356,885 A | * | 11/1982 | Dello | 181/227 |
| 4,359,865 A | * | 11/1982 | Nakao et al. | 60/313 |
| 5,937,640 A | * | 8/1999 | Krzykowski et al. | 60/284 |
| 6,141,958 A | * | 11/2000 | Voss | 60/272 |
| 6,193,004 B1 | * | 2/2001 | Cooksey et al. | 180/219 |
| 6,334,501 B1 | * | 1/2002 | Kawamoto | 180/309 |

* cited by examiner

Primary Examiner—Binh Q. Tran
(74) Attorney, Agent, or Firm—Knobbe Martens Olson & Bear LLP

(57) ABSTRACT

An exhaust system for an internal combustion engine having a first cylinder and a second cylinder from which pulses of exhaust gas exit and are routed along separate paths towards the exhaust mufflers. The exhaust system independently routes the pulses of exhaust gas from the two cylinders. The exhaust gases that are expelled from the first cylinder are routed through a first exhaust pipe. The exhaust gases that are expelled from the second cylinder are routed through a second exhaust pipe assembly. The second exhaust pipe assembly routes the exhaust gasses from an exhaust port for the second cylinder laterally across the motorcycle to achieve a true dual exhaust system. The second exhaust pipe assembly provides an approximate equal length flow path as compared to the path used by the exhaust gasses that are expelled from the first cylinder.

5 Claims, 7 Drawing Sheets

DUAL MOTORCYCLE EXHAUST SYSTEM

RELATED APPLICATIONS

This application claims priority from U.S. Provisional Patent Application Ser. No. 60/326,026, entitled TRUE DUAL MOTORCYCLE EXHAUST SYSTEM, filed Sep. 26, 2001 the disclosure of which is incorporated herein by reference in its entirety.

BACKGROUND OF THE INVENTION

1. Field of the Invention

This invention relates generally to exhaust systems. More particularly, the invention relates to an exhaust system for a multi-cylinder internal combustion engine.

2. Background

Motorcycles commonly employ exhaust systems to convey the exhaust gas from the engine's cylinder to the ambient environment. The journey begins at the engine cylinder, which incorporates intake and exhaust ports for ingress and egress to the cylinder. Fresh air mixed with fuel enters the engine cylinder through the intake port where it is subsequently compressed by a piston and ignited. A rapid expansion of the compressed fuel and air occurs, thereby forcefully moving the piston in the opposite direction to the compression stroke. Once the expansion is complete, the exhaust port opens to allow the combustion by-products or gas to exit the engine cylinder and enter an exhaust pipe. The exhaust port may be a passageway into the engine cylinder that is uncovered by the retreating piston, as in a two-stroke design well known in the art. In the case of a four-stroke design, a valve is utilized to open or close the exhaust port. The exhaust gas expelled from the engine cylinder, after passing through the exhaust port, enters an exhaust pipe. The exhaust pipe is designed to direct the exhaust gas towards the rear of the motorcycle and commonly utilizes bends and curves to accomplish this goal.

In the case of a V-Twin Harley-Davidson® motorcycle engine, the design of the stock OEM exhaust system affects the motorcycle's performance. The OEM exhaust system comprises a partial dual exhaust system with unequal length exhaust pipes from each cylinder. This system allows some communication between the exhaust gases from the cylinders via a crossover pipe. However, the design of this crossover pipe is detrimental to the engine's performance. The exhaust gases from the cylinders interfere with each other as they are routed to two exhaust mufflers. Moreover, the routing path of the gases from the engine exhaust ports to the exhaust mufflers increases the exhaust systems backpressure.

The design of the stock OEM exhaust system for the V-Twin Harley-Davidson® motorcycle also affects the aural sensation experienced by the rider. For example, the sound of the OEM exhaust system is uneven as heard by the rider due to the exhaust system's design. Further, during the engine's transition from under load to a state of deceleration, the engine emits a staccato popping sound that is not pleasing to the ear. Any potential aftermarket fix for these performance and aural sensation issues is further complicated by the design of the Harley-Davidson® OEM exhaust system which attaches to the chassis of the motorcycle at fixed points, thus impeding any modifications to the exhaust system without permanent changes to the motorcycle.

SUMMARY OF THE INVENTION

One embodiment of the present invention is an exhaust system for a V-Twin motorcycle engine. This embodiments provides a substantial improvement to the well-known Harley-Davidson® engine.

One aspect of the aftermarket exhaust system constructed in accordance with one embodiment of the present invention is an exhaust system which comprises a first exhaust port in communication with a first cylinder of the engine to discharge a first pulse of exhaust gas, a second exhaust port in communication with a second cylinder of the engine to discharge a second pulse of exhaust gas, wherein the first and second exhaust ports are both located on a first side of the V-Twin engine. The system further comprises a first exhaust pipe having an inlet end and an outlet end, wherein the inlet end is connected to the first exhaust port for scavenging and routing the first pulse of exhaust gas along the first side and in a direction aft of the motorcycle chassis, a second exhaust pipe having an inlet end and an outlet end, wherein the inlet end is connected to the second exhaust port for scavenge and routing the second pulse of exhaust gas through the motorcycle chassis and along a second side of the V-Twin engine in a direction aft of the motorcycle chassis, wherein the first and second sides are substantially parallel with the motorcycle chassis, and wherein the second exhaust pipe utilizes an OEM attachment point to the motorcycle chassis. The system still further comprises a first muffler connected to and in flow communication with the first exhaust pipe, wherein the first pulse of exhaust gas is expelled through the first muffler to the atmosphere, and a second muffler connected to and in flow communication with the second exhaust pipe, wherein the second pulse of exhaust gas is expelled through the second muffler to the atmosphere.

Another aspect of the present invention is a motorcycle with a two cylinder V-Twin engine and a true dual exhaust system wherein the true dual exhaust system individually routes exhaust gases from the two cylinders to a pair of mufflers.

Still another aspect of the present invention is a motorcycle that comprises a frame, a V-twin engine attached to the frame and having a first and a second cylinder head, each containing a cylinder, wherein the first and second cylinder heads exhaust gas on a same side of the V-twin engine, and a dual exhaust system in flow communication with the two cylinder heads and configured to route exhaust gases from the two cylinders, to different sides of the frame, and to the atmosphere.

Yet another aspect of the present invention is an exhaust system component for a Harley-Davidson® motorcycle with a V-Twin engine, wherein the V-twin engine comprises first and second exhaust ports, both located on a first side of the V-twin engine, and wherein the second exhaust port is located rearward of the first exhaust port. The exhaust system component comprises an exhaust pipe having an inlet end and an outlet end, wherein the inlet end is configured to route exhaust gases from the second exhaust port and through the motorcycle and along a second side of the V-Twin engine in a direction rearward of the motorcycle, wherein the first and second sides are substantially parallel with the motorcycle, and wherein the exhaust pipe utilizes an OEM attachment point to the motorcycle.

Still another aspect of the present invention is a method of processing exhaust gases from a V-Twin engine in a motorcycle, wherein a first pulse of exhaust gas is produced in a first cylinder of the V-Twin engine and a second pulse of exhaust gas is produced in a second cylinder of the V-Twin engine. The method comprises routing the first pulse of exhaust gas from the first cylinder and along a first side of the V-Twin engine, wherein the first cylinder exhausts the first pulse of gas on the first side of the V-Twin engine, and routing the second pulse of exhaust gas from the second cylinder and along the first side of the V-Twin engine and back under a seat of the motorcycle to a second side of the V-Twin engine, wherein the second cylinder exhausts the second pulse of gas on the first side of the V-Twin engine, and wherein the first pulse of exhaust gas and the second pulse of exhaust gas follow different flow paths.

BRIEF DESCRIPTION OF THE DRAWINGS

The features, objectives, and advantages of the embodiments of the invention will become more apparent from the detailed description set forth below when taken in conjunction with the drawings wherein like parts are identified with like reference numerals throughout, and wherein.

DETAILED DESCRIPTION OF THE INVENTION

Figure 1:
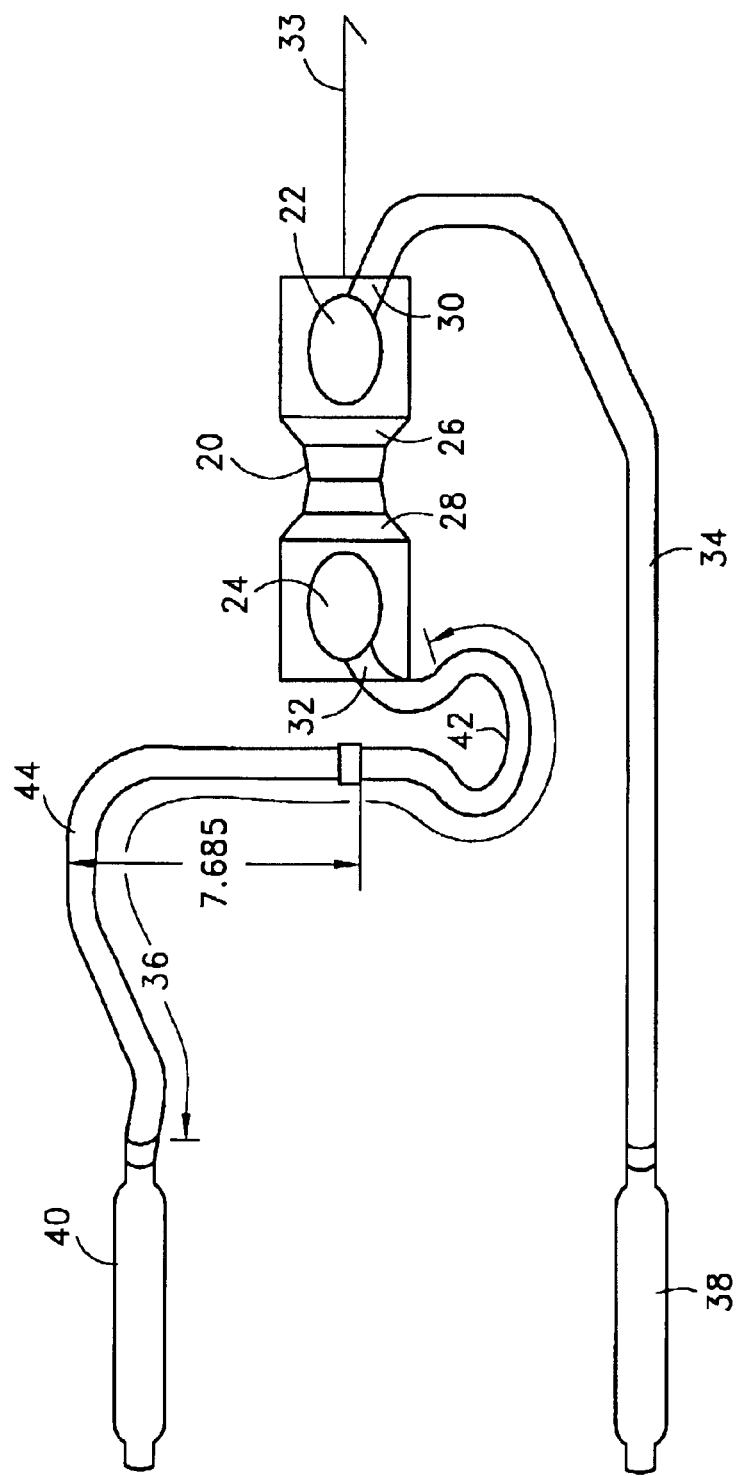
FIG. 1 is a top plan view showing an exhaust system according to one embodiment of the invention.

In a single cylinder engine, the exhaust gas, after passing through the exhaust pipe, is typically fed into a muffler prior to its expulsion into the atmosphere to dissipate unwanted noise originating in the combustion process. The exhaust system may also include a catalytic converter or other exhaust treatment device well known in the art. The muffler design will significantly affect the audible noise level or sound of the engine. A manufacturer can attenuate or change the sound of the engine so as to not only meet governmental noise requirements but also for the engine to exhibit a pleasing sound to the ear.

Depending on the design of the exhaust system, including the muffler and exhaust pipe, back pressure will be introduced into the exhaust system. Back pressure impedes the free flow of exhaust gases along the exhaust system's entire length. For example, in a four-stroke engine the piston pushes the exhaust gases out of the cylinder and into the exhaust system. If the back pressure in the exhaust system is reduced, the piston requires less force to expel the exhaust gases from the engine cylinder thereby increasing the performance and efficiency of the engine.

The performance of an engine is measured by the engine's generation of, for example, horsepower and torque. These two values can be measured over the entire RPM operating range as well as their peak values. Generally, less back pressure will enhance the performance of the engine by increasing the engine's efficiency. This rise in efficiency can further reduce the engine's fuel consumption. However, a significant reduction in back pressure, which may be accomplished by, for example, using short exhaust pipes and no muffler, may have an adverse effect on engine noise and overall performance. An exhaust system design that maximizes the horsepower of an engine will often have a deleterious effect on the engine's torque production over a portion of the RPM range. If this drop in torque is located in the middle of the RPM range, it may be noticeable as a momentary drop in acceleration to the rider or driver and be undesirable.

The overall length and shape of the exhaust system is an important factor in determining how the engine will operate and affects the performance of the engine. For example, with a multi-cylinder engine the routing of the individual exhaust systems for each cylinder will affect flow turbulence. Flow turbulence can be caused by pulses of exhaust gas from the different cylinders combining before being expelled to the atmosphere.

Moreover, the geometry of the exhaust ports by which the exhaust is expelled form the engine cylinders, may also hamper the design of the exhaust system. Furthermore, the design of an exhaust system is also affected by cost, size, weight, and packaging limitations. This concern is especially acute for a motorcycle since the exhaust system needs to fit close to the motorcycle frame so that the rider and passenger can straddle the motorcycle and not be subjected to burns or the like caused by contact with the hot exhaust system. An automobile is less prone to the concern for unwanted contact with the exhaust system as the car's floorpan is a barrier between the exhaust system and the occupants. A motorcycle, in a similar fashion, can incorporate heat shields to cover the exhaust system to further protect the rider/passenger from the hot exhaust system. This heat shield may also act as a sound barrier to reduce the noise associated with the exhaust system. For an automobile, the length of the exhaust system may be increased to help dampen out the engine noise originating in the combustion process, but this may not be well suited for a motorcycle due to a motorcycle's relatively short length as compared to an automobile.

Exhaust systems are commonly routed along the sides or below the motorcycle depending on such design factors as, for example, the orientation of the engine cylinders with respect to one another, the orientation of the engine in the motorcycle frame, the preferred riding characteristics, aesthetics, the size of the motorcycle, and the location of the motorcycle's center of gravity. A motorcycle with a transverse engine to its frame may be able to route its exhaust system below the engine and frame without increasing the overall width of the motorcycle. The cylinders of a transverse engine are often located at similar distances from the mufflers, which simplifies designing an equal length exhaust system.

A motorcycle with an engine inline with the frame, for example, an inline "V" configuration, may be able to route its exhaust system along both sides of the motorcycle due to its narrower width. However, in such an arrangement, the engine cylinders will not be located at similar distances from the mufflers. This configuration causes some of the exhaust gases to travel a longer distance prior to being expelled to the atmosphere. The location of each exhaust port around the circumference of its associated cylinder may also increase the difficulty in designing an exhaust system for an inline engine.

As a result of the many tradeoffs associated with the design of an exhaust system, a manufacturer will choose an exhaust system that presents a compromise between these characteristics for the consumer. As discussed above, these characteristics may include, for example, cost, size, weight, engine noise, aesthetics, performance, and packaging limitations.

Customization of exhaust components by motorcycle riders, such as exhaust pipes and mufflers, is common in the aftermarket. Customization allows the owner to re-optimize the characteristics of their vehicle so as to maximize their own satisfaction. A successful customization leads to not only personal satisfaction of accomplishment, but also a feeling of attachment to the vehicle. Often, the replacement of a component made by the original equipment manufacturer (OEM) with an aftermarket part does not live up to expectations and will not be easily reversible once it is completed. This can lead to the owner incurring additional costs to reverse the modification. For example, the addition of a force air induction system to an automobile often requires the cutting of a hole in the hood over an engine. If the owner decided the additional noise outweighed the performance increase, the purchase of a new hood would have to be absorbed to reverse the modification. In the case of exhaust systems, incorporation of aftermarket components often requires cutting and welding of the OEM exhaust system. Exhaust pipes or other parts of the exhaust system are often cut with subsequent welding being performed to incorporate the aftermarket component. Thus, the level of financial risk being taken by the owner and difficulty in reversing the modification are increased.

One significant feature of embodiments of this invention is that it provides the benefits of using a true dual exhaust system while minimizing cost, weight and packaging issues associated with such a system. The exhaust system allows the pulses of exhaust gas from different cylinders to be individually routed through the exhaust system. By individually routing the exhaust systems, the inherent drawbacks of combining pulses of exhaust gases are avoided. Combining the pulses of exhaust gas incorrectly from multiple cylinders can lead to an increase in back pressure and a corresponding drop in engine performance. In the present invention, the separation of the pulses of exhaust gas from multiple cylinders increases the performance of the engine by enhancing scavenging. As a result, exhaust systems constructed in accordance with this invention actually increase the exit velocity of the exhaust gas from the engine cylinder.

Another feature of the invention is that each cylinder has substantially its own equal length exhaust pipe. This means each exhaust pipe is routed between the exhaust port and the mufflers such that all of the exhaust pipes have the same overall length. The length of the exhaust pipe affects the performance of the cylinder from which the exhaust pipe receives the pulses of exhaust gas. Using equal length exhaust pipes for each cylinder of a multi-cylinder engine allows all of the cylinders of a multi-engine to be uniformly optimized.

Still another feature of the invention is that it emits a strong, throaty rumble typically preferred by riders of touring bikes, yet not so loud as to cause undue rider fatigue on a long road trip. In contrast, the OEM exhaust system for the Harley-Davidson® results in an uneven sound coming from the two mufflers. Moreover, the OEM exhaust system exhibits an unpleasant popping sound during deceleration which is not present when the exhaust system according to the embodiments disclosed herein is employed.

FIG. 1 is a top plan view showing an exhaust system according to one embodiment of the invention. An internal combustion engine 20 has two cylinders 22, 24 arranged in-line. Each of the two cylinders 22, 24 have fixedly attached a cylinder head 26, 28 which forms two combustion chambers (not shown). Each cylinder head 26, 28 incorporates an intake port (not shown) and an exhaust port 30, 32 for ingress and egress to the each cylinder 22, 24. The intake ports are connected to an intake system (not shown) located between the cylinders 22, 24. The intake system mixes fresh air with fuel before they enter the engine cylinders 22, 24. The mixed air and fuel is subsequently compressed by a piston (not shown) into each of the combustion chambers and ignited. A rapid expansion of the compressed fuel and air occurs, thereby forcefully moving the piston in the opposite direction to the compression stroke. The exhaust ports 30, 32 are located on the same side with respect to a centerline 33 through engine 20.

The ignition of the compressed fuel and air occurs in an alternating sequence whereby one of the cylinders 22, 24 transmits a pulse of exhaust gas followed by the transmission of another pulse of exhaust gas from the other cylinder 22, 24. In the embodiment shown in FIG. 1, this sequence continually repeats during the operation of the internal combustion engine 20. Once the rapid expansion of the compressed fuel and air is complete, the exhaust port 30, 32 which is in flow communication with the ignited engine cylinder 22, 24 opens to allow the combustion by-products or pulse of gas to exit. The exiting pulse of exhaust gas travels from the cylinder head 26, 28 and into a first or a second exhaust pipe 34, 36. As illustrated in FIG. 1, the first exhaust pipe 34 receives pulses of exhaust gas from the first cylinder 22. Similarly, the second exhaust pipe 36 receives pulses of exhaust gas from the second cylinder 24.

The first exhaust pipe 34 has an inlet end and an outlet end. The inlet end is connected to the exhaust port 30 to scavenge each pulse of exhaust gas from engine cylinder 22. The first exhaust pipe 34 is configured to route the scavenged pulse of exhaust gas away from the engine 20 and towards its outlet end. The outlet end is in flow communication with a first muffler 38. The first muffler 38 is configured to exhaust the pulse of exhaust gas received from the first exhaust pipe 34 into the atmosphere.

The second exhaust pipe 36 has an inlet end and an outlet end. The inlet end is connected to the exhaust port 32 to scavenge each pulse of exhaust gas from engine cylinder 24. The second exhaust pipe 36 is configured to route the scavenged pulse of exhaust gas away from the engine 20 and towards its outlet end. The outlet end is in flow communication with a second muffler 40. The second muffler 40 is configured to exhaust the pulse of exhaust gas received from the second exhaust pipe 36 into the atmosphere.

The first and second exhaust pipes 34, 36 are approximately of equal length. This means each pulse of exhaust gas expelled from the engine 20 travels approximately the same distance prior to being expelled to the atmosphere. The benefit to using equal length first and second exhaust pipes is that the pulses of exhaust gas will not arrive at the same time at each of the mufflers 38, 40, which minimizes any aural interference between the pulses. In one embodiment, the length of the first exhaust pipe 34 is within 10% of the length of the second exhaust pipe 36.

The use of approximately equal length first and second exhaust pipes, as compared to an exhaust system that use unequal length exhaust pipes, increases the performance of the internal combustion engine 20 by enhancing scavenging.

Scavenging is the process of removing the exhaust gases from the cylinders. Scavenging may be enhanced or reduced depending on the design of the exhaust system coupled with the design of the internal combustion engine 20. For example, the design of an internal combustion engine along with the engine's performance goals will dictate the optimal length of its exhaust system. For example, an engine designed to maximize torque may require a longer exhaust system than the same engine if optimized for maximum horsepower. The likely operating range of the engine will also affect the selection of the length of the exhaust system. Moreover, the incorrect combining of pulses of exhaust gases from different cylinders due to exhaust length variations may lead to an increase in back pressure and a corresponding drop in engine performance.

In signal cylinder engines, the routing of the exhaust system to maximize scavenging is simplified as compared to routing for multi-cylinder applications. Often, the exhaust ports for the multi-cylinder engine are located at varying distances from the exhaust mufflers. In such a situation, the length of the exhaust system does not optimize the desired engine characteristic for all of the cylinders of the engine. To maximize the desired characteristic for all of the cylinders of the engine, the pulses of exhaust gas should travel a similar distance prior to their expulsion into the environment. A properly scavenged engine will actually increase the exit velocity of the pulse of exhaust gas from the cylinders 22, 24.

Each pulse of exhaust gas that is exited to the atmosphere forms a low-pressure zone (not shown) in its wake. This low-pressure zone preferentially travels back up the exhaust system towards the exhaust port to scavenge a subsequent pulse of exhaust gas. In a four-stroke engine, this reduces the force required by the piston to expel the pulse of exhaust gas from the plurality of cylinders 22, 24. For example, the use of equal length first and second exhaust pipes 34, 36 improves engine scavenging whereby the performance of the engine is improved.

Still referring to FIG. 1, the second exhaust pipe 36 comprises an upstream pipe 42 and a downstream pipe 44. The upstream pipe 42 is in communication with the second exhaust port 32 and routes the pulse of exhaust gas from a first side of the engine 20 and across the centerline 33 towards a second side. As shown in FIG. 1, the upstream pipe 42 is in flow communication with the downstream pipe 44. The downstream pipe 44 further routes the pulse of exhaust gas to the second muffler 40. The width of the downstream pipe 44, measured in a direction that is perpendicular to centerline 33, can range between 7.185 and 8.185 inches. In the embodiment illustrated in FIG. 1, the width is 7.685 inches.

Figure 2:
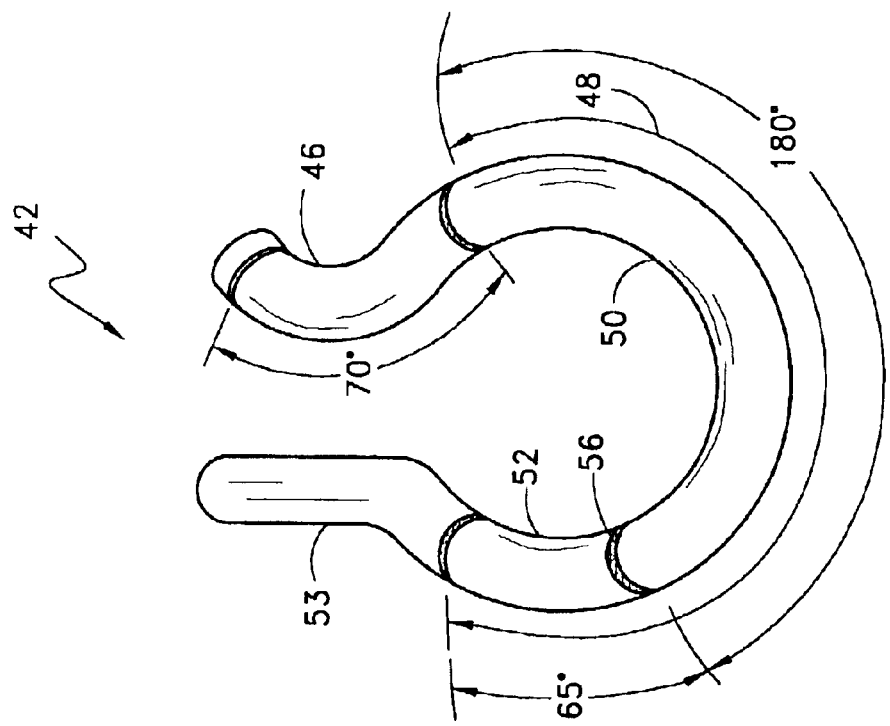
FIG. 2 is a side perspective view of an upstream pipe shown in FIG. 1 in accordance with one embodiment of the invention.

The operation of the upstream pipe 42 may be understood upon reference to FIG. 2, which is a side perspective view of the upstream pipe 42 in accordance with the invention. The upstream pipe 42 comprises a first elbow 46 in flow communication with the exhaust port 32. The first elbow 46 routes the pulse of exhaust gas away from the exhaust port 32. The first elbow 46 has substantially a 2" radius of curvature for less than a 90-degree arc. In one embodiment, the arc length ranges between 65 and 75 degrees. In the embodiment illustrated in FIG. 2, the arc length is 70 degrees.

The first elbow 46 is in flow communication with a second elbow 48. The second elbow 48 routes the pulse of exhaust gas received from the first elbow 46 through at least a 180 degree turn towards the centerline 33 (see FIG. 1). In one embodiment, the second elbow 48 routes the pulse of exhaust gas through a 245 degree turn. The second elbow 48 has substantially a 2.5" radius of curvature for greater than the 180 degree arc. In one embodiment, the second elbow 48 is not coplanar with the first elbow 46.

As shown in FIG. 2, the second elbow 48 comprises a first sub-elbow 50 and a second sub-elbow 52 joined at a weld 56. The first sub-elbow 50 and the second sub-elbow 52 are in flow communication. The first sub-elbow 50 has an approximate 180-degree arc while the second sub-elbow 52 has an approximate arc length of less than 90 degrees. In the embodiment illustrated in FIG. 2, the second sub-elbow 52 has a 65 degree arc length. In one embodiment, the first sub-elbow 50 and the second sub-elbow 52 are not coplanar.

Connected to and in flow communication with the second elbow 48 is a third elbow 53. The third elbow 53 routes the pulse of exhaust gas from the second elbow 48 and in a direction towards the centerline 33 when installed (see FIG. 1). The third elbow has substantially a 2.5" radius for an approximate arc length of less than 90 degrees. In the embodiment illustrated in FIG. 2, the third elbow 53 has an arc length of 75 degrees. The geometry of the third elbow 53 is further illustrated in FIG. 8. The first, second, third, and fourth elbows are advantageously fabricated from a metallic material. For example, one embodiment utilizes 16-gauge steel with a 1¾ inch diameter. Alternatively, a 1 and ⅞ inch diameter is utilized.

Figure 3:
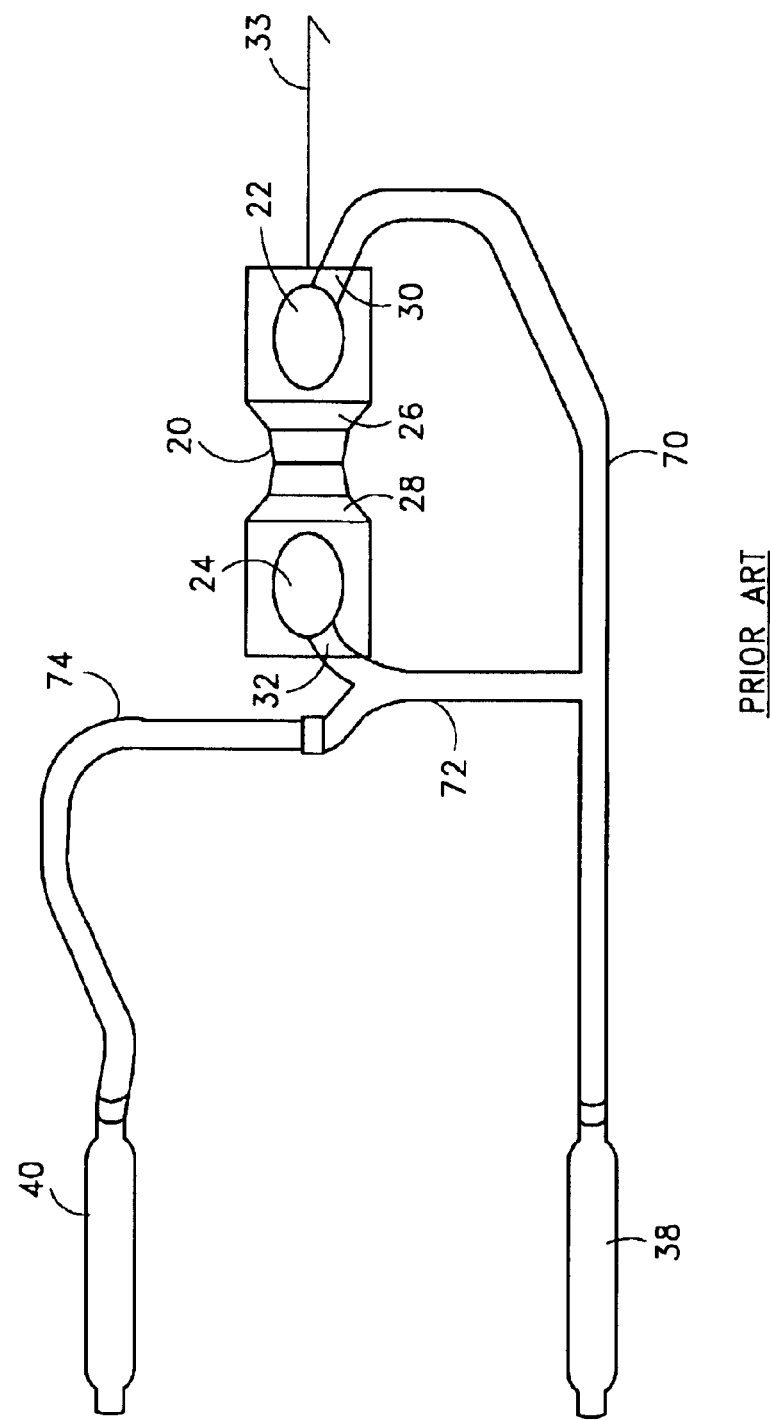
FIG. 3 is a top plan view showing a Harley-Davidson® OEM exhaust system.

FIG. 3 is a top plan view showing a Harley-Davidson® OEM exhaust system. In contrast to the exhaust system described with reference to FIG. 1, the Harley-Davidson® OEM exhaust system comprises a stock first exhaust pipe 70, a stock cross-over exhaust pipe 72, and a stock second exhaust pipe 74. The stock first exhaust pipe 70 has an inlet end, an outlet end, and a cross-over connection therebetween. The inlet end is connected to the exhaust port 30 to scavenge each pulse of exhaust gas from engine cylinder 22. The stock first exhaust pipe 70 is configured to route the scavenged pulse of exhaust gas away from the engine 20. The outlet end of the stock first exhaust pipe 70 is in flow communication with a first muffler 38. The cross-over connection connects the stock first exhaust pipe 70 with the stock cross-over exhaust pipe 72.

The stock cross-over exhaust pipe 72 has an inlet end and two outlet ends. The inlet end is connected to the exhaust port 32 to scavenge each pulse of exhaust gas from engine cylinder 24. One of the outlet ends is connected to the stock first exhaust pipe 70 at the cross-over connection location. The other outlet end is connected to the stock second exhaust pipe 74. The stock cross-over exhaust pipe 72 is configured to route the scavenged pulse of exhaust gas away from the engine 20 and towards both of its outlet ends.

The stock second exhaust pipe 74 is in flow communication with the stock cross-over pipe 72 and a second muffler 40. The second muffler 40 is configured to exhaust the pulse of exhaust gas received from the stock second exhaust pipe 74 into the atmosphere.

Figure 4:
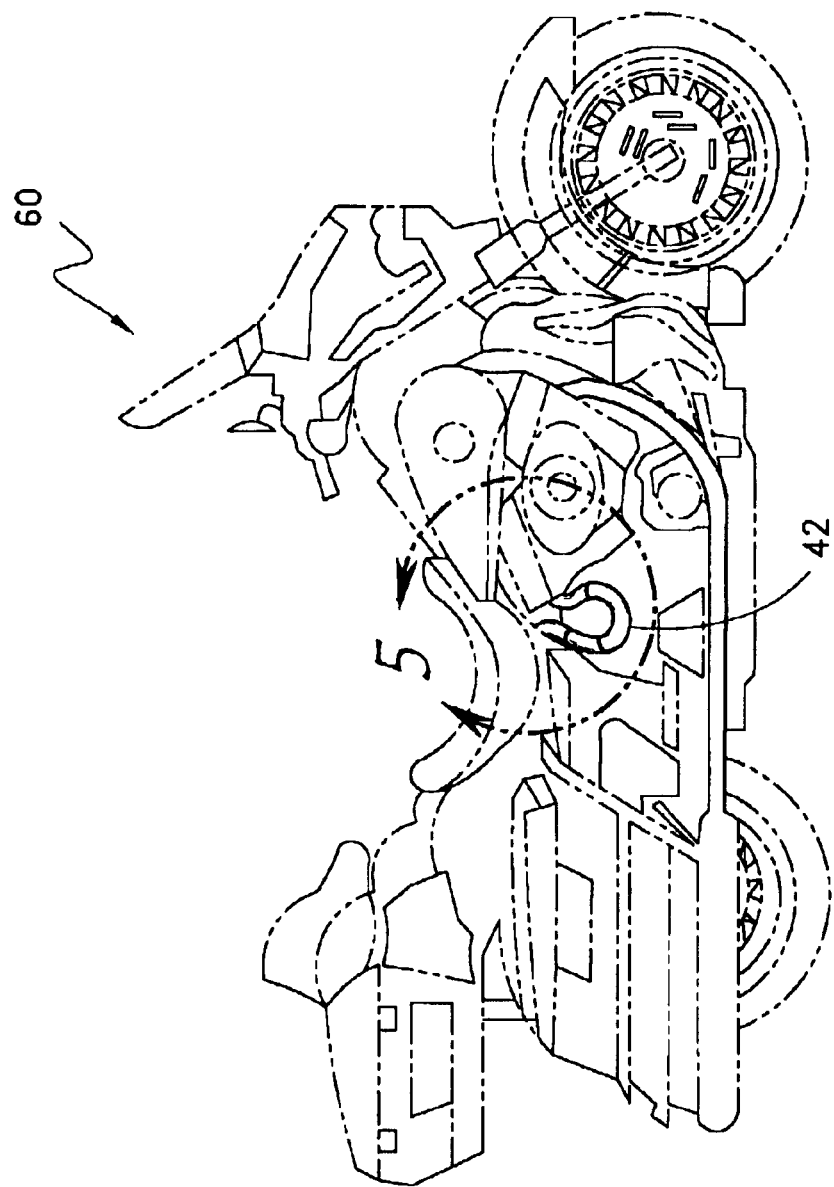
FIG. 4 is a side perspective view of a Harley-Davidson® motorcycle incorporating the upstream pipe into its OEM exhaust system.

In one embodiment of the invention, as illustrated in FIG. 4, a Harley-Davidson® motorcycle 60 is shown with the upstream pipe 42 from FIG. 2 incorporated into the Harley-Davidson® OEM exhaust system of FIG. 3. A feature of this embodiment is that the OEM exhaust system is partially retained. Portions of the OEM exhaust system which route the exhaust gases from both cylinders 22, 24 to the mufflers 38, 40 are incorporated into the exhaust system shown in FIG. 4. Referring back to FIGS. 1 and 3, the upstream pipe 42 can connect with the stock second exhaust pipe 74 of the Harley-Davidson® OEM exhaust system. Moreover, an OEM bracket located under the rider's seat is used to attach the upstream pipe 42 to the motorcycle 60. The stock second exhaust pipe 74 can route the pulses of exhaust gas from the upstream pipe 42 to the muffler 40. Alternatively, the stock second exhaust pipe 74 is replaced with the downstream pipe 44 (see FIG. 1).

Referring to FIG. 3, the stock first exhaust pipe 70 which routes the pulses of exhaust gas from cylinder 22 to the muffler 38 is retained with a slight modification. This modification requires a tubular section (not shown) to be installed where the stock first exhaust pipe 70 connects with the stock cross-over pipe 72. Alternatively, the stock first exhaust pipe 70 is removed and replaced with the first exhaust pipe 34.

Figure 5:
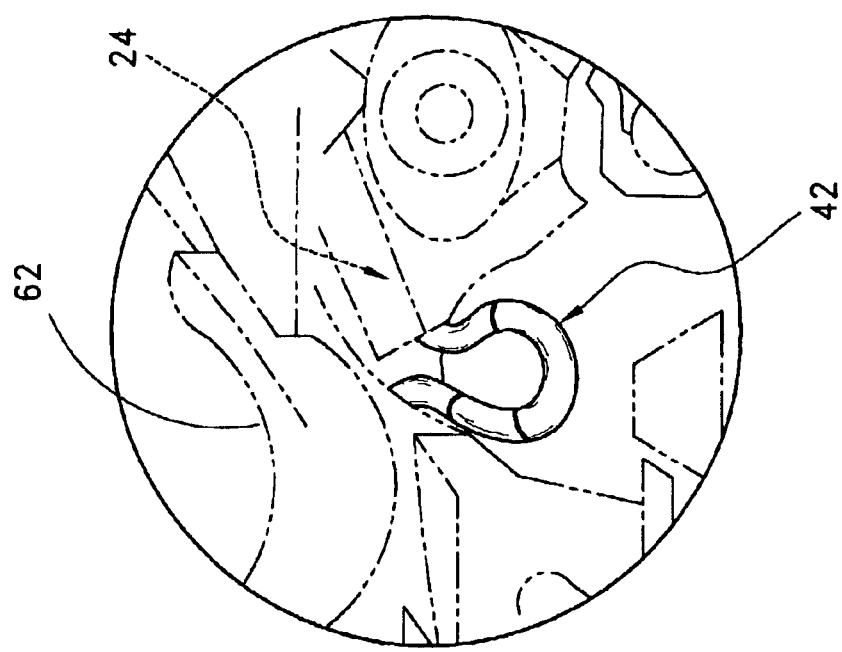
FIG. 5 is a side perspective view of a portion of the motorcycle exhaust system encompassed within line 5 of FIG. 4 and shows the upstream pipe of the present invention connected to a cylinder.

FIG. 5 is a side perspective view of a portion of the motorcycle exhaust system encompassed within line 5 of FIG. 4 and shows the upstream pipe 42 of the present invention connected to the cylinder 24. The upstream pipe 42 routes the pulses of exhaust gas under seat 62 and towards the opposite side of the motorcycle 60.

Figure 6:
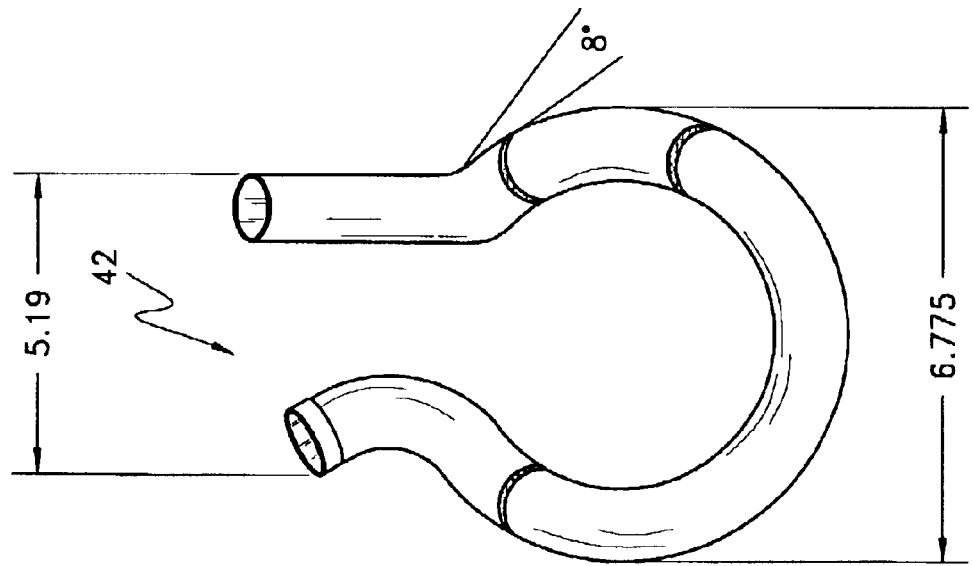
FIG. 6 is a side perspective view of the upstream pipe from FIG. 2, taken on the opposite side of the motorcycle to that of FIG. 4.

FIG. 6 is a side perspective view of the upstream pipe 42 from FIG. 2, taken on the opposite side of the motorcycle to that of FIG. 4. The embodiment of the upstream pipe 42 illustrated in FIG. 6 has a length along a lower dimension that ranges from 6.27 to 7.28 inches. In one advantageous embodiment where the upstream pipe 42 was incorporated into the Harley-Davidson® motorcycle 60, the length was measured to be 6.775 inches. The upper dimension can range from 4.69 to 5.69 inches. In one embodiment, the upper dimension was measured to be approximately 5.19 inches. However, embodiments of the upstream pipe 42 are not so limited to the embodiments described herein. The upper and lower dimensions are substantially parallel to the centerline 33 (see FIG. 1).

Figure 7:
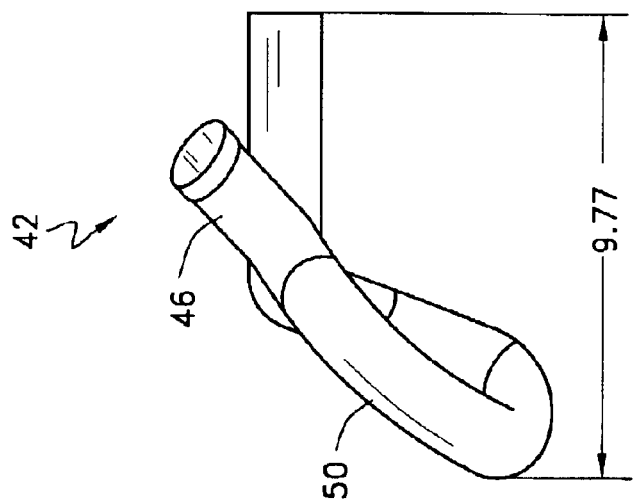
FIG. 7 is a front perspective view of the upstream pipe shown in FIG. 2 as installed on the motorcycle of FIG. 4.

FIG. 7 is a front perspective view of the upstream pipe 42 from FIG. 2, as installed on the motorcycle of FIG. 4 showing the first elbow 46 and the first sub-elbow 50 lying in different planes. The width of the upstream pipe 42, as measured in as direction that is perpendicular to the centerline 33 (see FIG. 1), ranges from approximately 9.27 to 10.27 inches. In one advantageous embodiment where the upstream pipe 42 was incorporated into the Harley-Davidson® motorcycle 60, the width of the upstream pipe was measured to be 9.77 inches.

Figure 8:
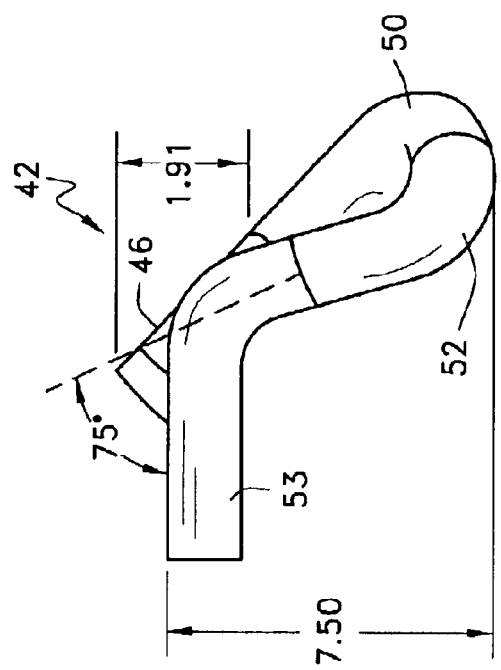
FIG. 8 is a rear perspective view of the upstream pipe shown in FIG. 2 as installed on the motorcycle of FIG. 4.

FIG. 8 is a rear perspective view of the upstream pipe 42, from FIG. 2, as installed on the motorcycle of FIG. 4 showing the first sub-elbow 50 and the second sub-elbow 52 lying in different planes. The third elbow 53 is shown routing the pulse of exhaust gas from the first side of the engine 20 (see FIG. 1) and towards the centerline 33 (see FIG. 1). As previously described with reference to FIG. 2, one embodiment of the third elbow 53 has an arc length of 75 degrees.

As illustrated in FIG. 8, the distance between an upper surface of the first elbow 46 and a weld location between the first elbow and the first sub-elbow 50 ranges from 1.41 to 2.41 inches. In one advantageous embodiment where the upstream pipe 42 was incorporated into the Harley-Davidson® motorcycle 60, this distance was measured to be 1.91 inches. As illustrated in FIG. 7, the distance between an upper surface of the third elbow 53 and a lower surface of the second elbow 48 ranges from 7 to 8 inches. In one advantageous embodiment where the upstream pipe 42 was incorporated into the Harley-Davidson® motorcycle 60, this distance was measured to be 7.5 inches.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. An exhaust system for a motorcycle with a V-Twin engine, wherein the exhaust system increases the engine's performance and incorporates original equipment manufacturer (OEM) attachment locations to a motorcycle chassis, said system comprising:

a first exhaust port in communication with a first cylinder of the engine to discharge a first pulse of exhaust gas;

a second exhaust port in communication with a second cylinder of the engine to discharge a second pulse of exhaust gas, wherein the first and second exhaust ports are both located on a first side of the V-Twin engine;

a first exhaust pipe having an inlet end and an outlet end, wherein the inlet end is connected to the first exhaust port for scavenging and routing the first pulse of exhaust gas along the first side and in a direction aft of the motorcycle chassis;

a second exhaust pipe having,
an inlet end and an outlet end, wherein the inlet end is connected to the second exhaust port for scavenge and routing the second pulse of exhaust gas through the motorcycle chassis and along a second side of the V-Twin engine in a direction aft of the motorcycle chassis, wherein the first and second sides are substantially parallel with the motorcycle chassis, and wherein the second exhaust pipe utilizes an OEM attachment point to the motorcycle chassis, and
an upstream pipe comprising a first elbow and a second elbow in flow communication with the first elbow, the first elbow being in flow communication with the second exhaust port, wherein the second elbow comprises a first sub-elbow and a second sub-elbow, and wherein the second sub-elbow is in flow communication with the first sub-elbow;

a first muffler connected to and in flow communication with the first exhaust pipe, wherein the first pulse of exhaust gas is expelled through the first muffler to the atmosphere; and a second muffler connected to and in flow communication with the second exhaust pipe, wherein the second pulse of exhaust gas is expelled through the second muffler to the atmosphere.

2. An exhaust system according to claim 1, wherein the upstream pipe comprises a third elbow in flow communication with the second elbow, wherein the third elbow routes the second pulse of exhaust gas from the second elbow and towards the second side of the motorcycle chassis.

3. An exhaust system according to claim 2, wherein the length of the first exhaust pipe and the length of the second exhaust pipe are approximately equal.

4. An exhaust system according to claim 2, wherein the length of the first exhaust pipe is within 10% of the length of the second exhaust pipe.

5. An exhaust system according to claim 4, wherein the first and second exhaust pipe have 1¾% inch diameters.

* * * * *